United States Patent [19]
Bryan

[11] Patent Number: 4,771,300
[45] Date of Patent: Sep. 13, 1988

[54] CAMERA MIRROR

[76] Inventor: Randy L. Bryan, 1115 Pierremont Rd., Shereveport, La. 71106

[21] Appl. No.: 12,382

[22] Filed: Feb. 9, 1987

[51] Int. Cl.$^4$ ..................... G03B 13/02; G03B 15/02; G03B 17/00
[52] U.S. Cl. .................................... 354/81; 354/126; 354/220; 354/293; 350/639
[58] Field of Search ...................... 354/81, 126, 145.1, 354/220, 293; 362/3; 350/600, 631, 632, 639

[56] References Cited
U.S. PATENT DOCUMENTS

| | | | |
|---|---|---|---|
| 1,099,820 | 6/1914 | Ridings | 354/220 |
| 1,709,598 | 4/1929 | Simjian | 354/220 |
| 1,794,142 | 2/1931 | Boston | 354/220 |
| 1,879,499 | 9/1932 | Pinkosh | 354/220 |
| 1,926,657 | 9/1933 | Simjian | 354/220 |
| 2,224,579 | 12/1940 | Wheelan | 354/220 |
| 4,025,933 | 5/1977 | Berg | 362/3 |
| 4,560,261 | 12/1985 | Ueda et al. | 354/220 |

Primary Examiner—A. A. Mathews
Attorney, Agent, or Firm—John M. Harrison

[57] ABSTRACT

A camera mirror which is designed to pose a subject and support a camera in offset relationship for taking photographs of the subject. The mirror and camera bracket for mounting the camera are mounted on a tripod and in a preferred embodiment, the camera is focused through an opening in the mirror and a flash attachment is mounted to the top or side of the mirror. The camera bracket is designed to facilitate orientation of the camera in both vertical and horizontal positions with the camera lens offset from the vertical centerline of the mirror for maximum efficiency in posing the subject and taking photographs.

21 Claims, 2 Drawing Sheets

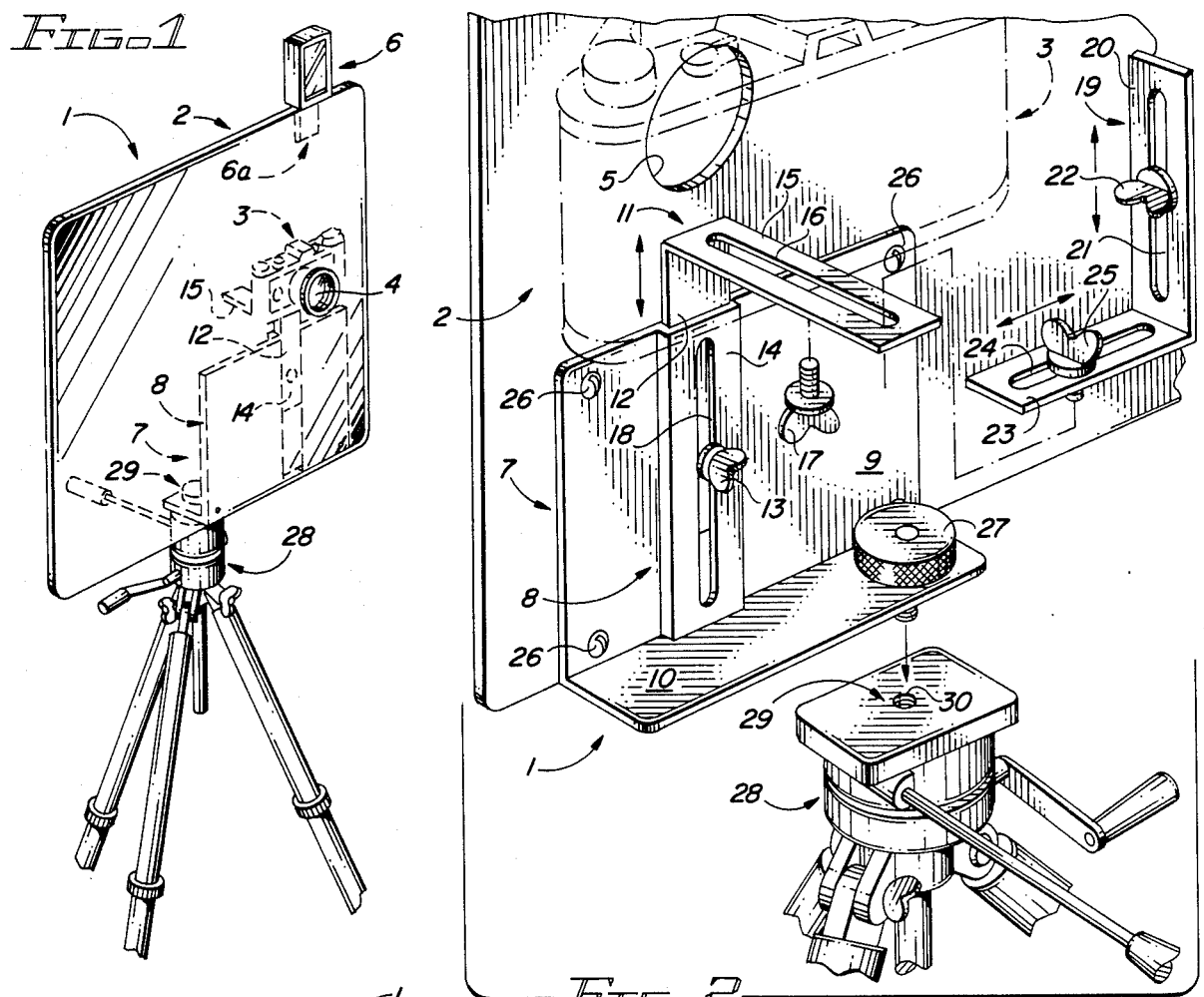
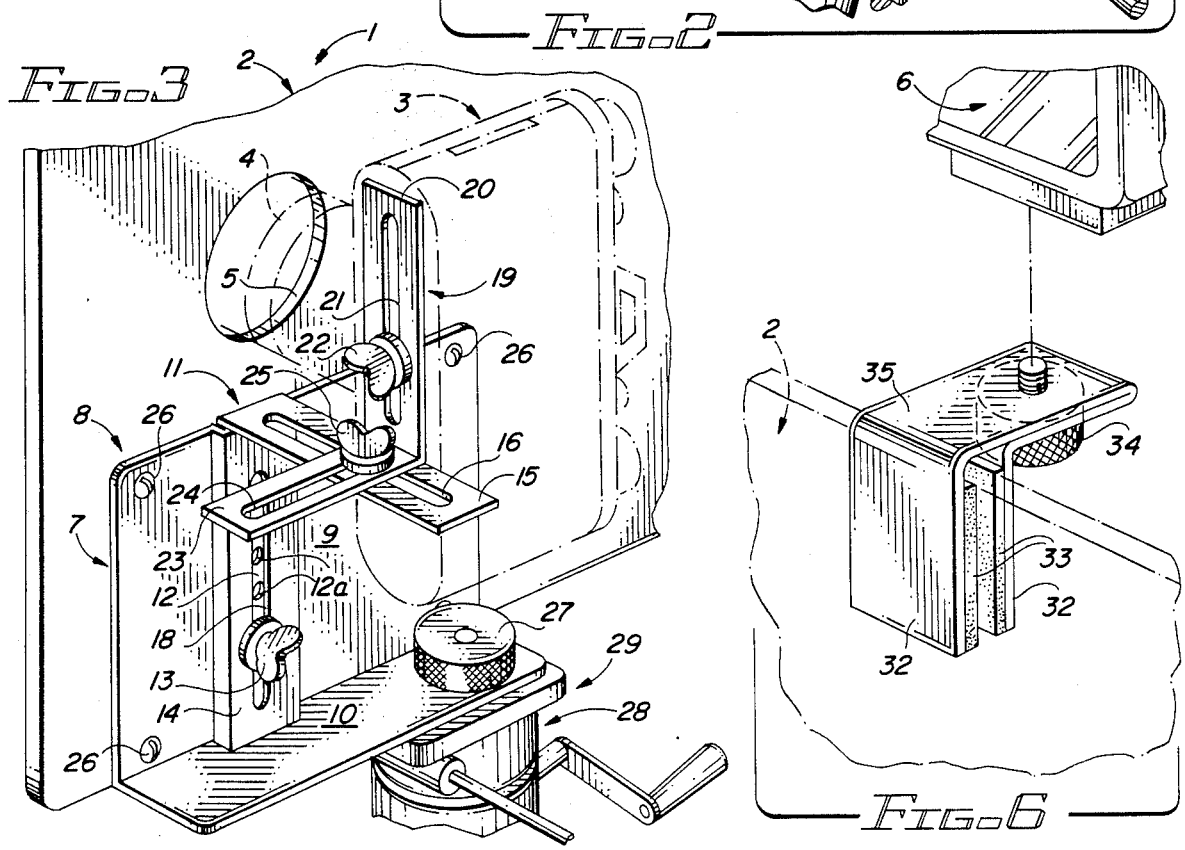

CAMERA MIRROR

BACKGROUND OF THE INVENTION

1. Field of the Invention

This invention relates to photography and more particularly, to a camera mirror which is fitted with a camera and a flash attachment for posing and photographing a subject. In a preferred embodiment the mirror is mounted on a tripod and is provided with a camera mount bracket which is capable of mounting a camera in both vertical and horizontal configuration, with the lens focused through an offset opening in the mirror to photograph the subject as posed by the mirror.

One of the problems in photography is the posing of one or more subjects such that all of the subjects achieve a satisfactory facial expression and position at the time the photograph is made. The problem becomes increasingly difficult as the number of people to be photographed increases, since the likelihood of one or more people blinking, moving or assuming an undesirable facial expression or body position increases with the number of people photographed.

Attempts to solve this problem include the use of one or more mirrors to reflect the image of the subject, in order to facilitate a suitable pose before the photograph is made. However, accurate posing is difficult since the camera lens is located in the center of the subject's image, resulting in distortion. It has surprisingly been found that posing efficiency can be increased while maintaining photographic quality, by offsetting the camera from the center area of the posing mirror.

2. Description of the Prior Art

A number of techniques and apparatus have been devised for posing one or more subjects by means of a mirror or mirrors and taking the subject's photograph. Typical of this prior art is U.S. Pat. No. 1,099,820, dated June 9, 1914, to G. T. Ridings, entitled "Combined Camera Support and Posing Device". The device of this invention includes a pedestal containing a mirror with an opening in the center to receive the camera lens and a support provided behind the mirror for supporting the camera. A "Posed Reflecting System For Photographic Apparatus" is disclosed in U.S. Pat. No. 1,709,598, dated Apr. 16, 1929, to L. G. Simjian. The system detailed in this patent includes a camera and lens system provided in cooperation with a mirror unit, such that the person being photographed can observe the image that the camera will photograph in order to enable him to assume a pose suitable to his taste. U.S. Pat. No. 1,794,142, dated Feb. 24, 1931, to W. C. Boston, discloses a "Posing Apparatus For Photographic Studios", which includes a seating position for an individual located in front of a concave mirror system having a camera lens in the center thereof, for posing the individual and then photographing him. A "Posed Reflecting System" is detailed in U.S. Pat. No. 1,926,657, dated Sept. 12, 1933, to L. G. Simjian. The posed reflecting system of this invention includes a rotatable mirror unit which is normally located such that the poser can observe a reflection of the exact image which the camera will record when the mirror is moved from a first position to a position in which the image of the poser is reflected into the lens system of a camera. The camera lens system does not point toward the poser but is aimed at an angle thereto, such that the poser's image as reflected in the mirror is taken by the camera instead of the direct image. U.S. Pat. No. 2,224,579, dated Dec. 10, 1940, to R. B. Wheelan, discloses "Posed Reflecting Photography". The Wheelan patent is characterized by a photographic apparatus which involves a light-pervious reflector designed such that the posing subject can view his image and through which light may pass from the subject to the camera, without disclosing the camera or its lens to the view of the posing subject. A polished surface and the back of the frame is provided with a cap which fits slidably over a corresponding flange around the objective lens.

It is an object of this invention to provide a new and improved camera mirror which is designed to pose a subject with little or no distortion and to mount and locate the camera in offset relationship for photographing the subject.

Another object of the invention is to provide a new and improved camera mirror which includes a sheet of reflective material having a camera mount bracket provided on the back thereof with the reflective surface facing a subject and the camera lens extending through an opening to one side of the center axis of the reflective mirror, in order to pose and accurately photograph a subject.

Still another object of this invention is to provide a new and improved camera mirror which is mounted on a tripod and is characterized by a sheet of reflective material having an opening therein for receiving a camera lens, which opening is located to one side of the vertical centerline of the mirror and further including a bracket attached to the mirror for mounting the camera in either horizontal or vertical configuration with the lens projecting through the opening and photographing a subject posed by observing a reflection in the mirror.

Still another object of this invention is to provide a camera mirror for posing and photographing a subject, which camera mirror is characterized by a sheet of reflective material mounted on a tripod and provided with an opening located off center from the vertical center line of the mirror for receiving a camera lens and minimizing distortion of the subject image on the mirror, and further including a bracket carried by the mirror and the tripod for supporting the camera in either vertical or horizontal adjustable configuration and photographing the subject.

SUMMARY OF THE INVENTION

These and other objects of the invention are provided in a camera mirror which is characterized by a mirror provided with a camera lens opening in offset relationship with respect to the vertical center line of the mirror and a bracket attached to the mirror and the tripod for mounting the camera in either horizontally or vertically adjustable configuration, such that the camera lens extends through the opening in the mirror for posing and photographing a subject who is facing and observing his or her reflection in the mirror.

BRIEF DESCRIPTION OF THE DRAWINGS

The invention will be better understood by reference to the accompanying drawings, wherein:

FIG. 1 is a perspective view of a preferred embodiment of the camera mirror of this invention with a camera mounted in horizontal configuration;

FIG. 2 is a perspective, partially exploded view of the camera mount elements of the camera mirror illustrated in FIG. 1, with the camera mounted in horizontal orientation in an adjustable camera mount bracket;

FIG. 3 is a perspective view, partially in section, of the camera mirror illustrated in FIG. 1, illustrating the camera mounted in vertical configuration in the adjustable camera mount bracket;

FIG. 6 is a perspective view of a preferred mount bracket for mounting the flash attachment on the camera mirror illustrated in FIG. 1;

DESCRIPTION OF THE PREFERRED EMBODIMENTS

Figure 4A:
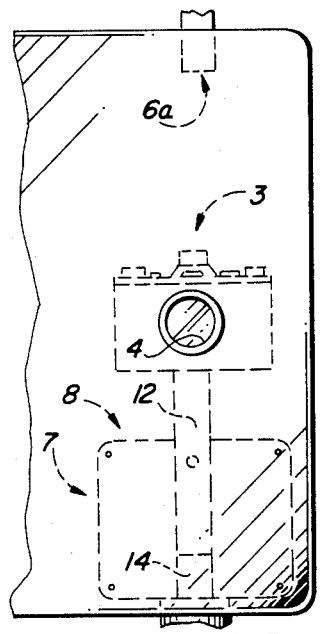
FIG. 4A is a front elevation of a portion of the camera mirror illustrated in FIG. 1, showing in the camera mounted in horizontal orientation.
Figure 4B:
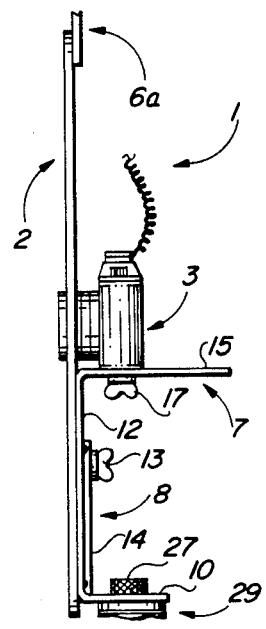
FIG. 4B is a side elevation of the camera mirror illustrated in FIG. 4A.

Referring initially to FIGS. 1 and 2 of the drawings, the camera mirror of this invention is generally illustrated by reference numeral 1. The camera mirror 1 includes a flat mirror 2 of selected size and a camera 3, provided with a camera lens 4, located on the opposite or non-reflective side of the mirror 2 and mounted on a camera mount bracket 7. The camera mount bracket 7 further includes a bracket mount plate 8, secured to the mirror 2 by means of mount bolts 26 and having a vertical leg 9 and a horizontal leg 10. The horizontal leg 10 is adapted for attachment to the tripod plate 29 of a tripod 28 by means of a mount plate bolt 27, which extends through the horizontal leg 10 and tightens in a plate aperture 30 located in the tripod plate 29. The vertical leg 9 further includes a slide leg sleeve 14 which is fitted with a longitudinal sleeve slot 18, in order to accommodate a slide leg wing bolt 13, as illustrated in FIG. 2. The slide leg 12 of an L-shaped slide bracket 11 extends inside the slide leg sleeve 14 in slidable relationship and is provided with several spaced, threaded apertures 12a, for receiving the threaded end of a slide leg wing bolt 13, in order to vertically and slidably adjust the slide bracket 11 in the slide leg sleeve 14 with respect to the bracket mount plate 8. A base leg 15 extends outwardly and rearwardly of the mirror 2 from the slide leg 12 and completes the slide bracket 11. In a most preferred embodiment of the invention a longitudinal base leg slot 16 is provided in the base leg 15 for receiving a base leg wing bolt 17, which is designed to threadibly engage the base of the camera 3 when the camera 3 is oriented in horizontal configuration in the camera mount bracket 7, as hereinafter described. Referring now to FIGS. 2 and 3, an L-shaped auxiliary bracket 19 is designed to cooperate with the slide bracket 11 in perpendicular relationship and is characterized by a vertically-oriented top leg 20 having a longitudinal top leg slot 21 and a horizontally oriented bottom leg 23, provided with a longitudinal bottom leg slot 24, as illustrated in FIGS. 2 and 3. A top leg wing bolt 22 is designed to register with the top leg slot 21 of the top leg 20 and engage a threaded aperture (not illustrated) in the camera 3, while a bottom leg wing bolt 25 is designed to register in similar fashion with the bottom leg slot 24, provided in the bottom leg 23, and with the base leg slot 16 of the base leg 15, and receive a nut (not illustrated).

As further illustrated in FIG. 2, when the camera 3 is mounted in the camera mount bracket 7 in horizontal configuration, the base leg wing bolt 17 is inserted through the base leg slot 16 and threadibly engages the internally threaded aperture (not illustrated) in the camera base to secure the camera 3 in functional position. The camera 3 is horizontally adjusted by loosening the base leg wing bolt 17 to extend the camera lens 4 through the lens opening 5, provided in the mirror 2. The base leg wing bolt 17 is then tightened to secure the camera 3 securely in place.

Referring again to FIG. 3, the camera 3 can be mounted in vertical configuration by engaging the threads of the top leg wing bolt 22 with the threaded aperture (not illustrated) provided in the bottom of the camera 3 and providing the bottom leg wing bolt 25 with a suitable nut (not illustrated), after extending the bottom leg wing bolt 25 through the bottom leg slot 24, provided in the bottom leg 23 and the base leg slot 16, provided in the base leg 15 of the slide bracket 11. It will be appreciated from a consideration of FIGS. 2 and 3, that when the camera 3 is mounted in the horizontal configuration as illustrated in FIG. 2, the auxiliary bracket 19 is not needed. However, when the camera 3 is mounted in vertical orientation as illustrated in FIG. 3, the auxiliary bracket 19 must be secured to the slide bracket 11 in order to vertically orient the camera 3 and project the lens 4 of the camera 3 through the lens opening 5 provided in the mirror 2.

Referring now to FIGS. 1 and 6 of the drawings, in a most preferred embodiment of the invention the flash 6 is mounted to the top edge of the mirror by means of a flash bracket 6a. The flash bracket 6a is further characterized by a pair of parallel bracket feet 32 which extend on opposite sides of the mirror 2, with facing pads 33 carried by the inside surfaces of the bracket feet 32 for engaging opposite surfaces of the mirror 2. A flash bracket bolt 34 extends through the bracket support 35 of the flash bracket 6a and threadibly engages a corresponding threaded opening (not illustrated) provided in the flash 6, in order to removably secure the flash 6 to the flash bracket 6a.

Figure 7:
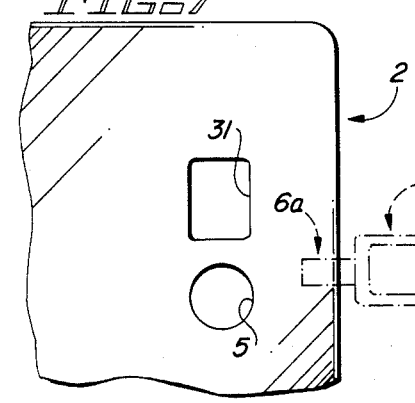
FIG. 7 is a front elevation of an alternative embodiment of the camera mirror illustrated in FIG. 1.

Referring to FIG. 7 of the drawings, in another preferred embodiment of the invention a rectangular-shaped auxiliary lens opening 31 is provided above the lens opening 5 in the mirror 2, in order to accommodate a flash 6, a second camera, a larger camera or a camera having a lens of different configuration than that of the camera 3. However, in this embodiment of the invention the flash 6 is mounted on the side edge of the mirror 2, instead of on the top edge or in the auxiliary lens opening 31 thereof and in a most preferred embodiment of the invention, the flash bracket 6a illustrated in FIG. 6 is used to mount the flash 6 on the mirror 2.

Figure 8:
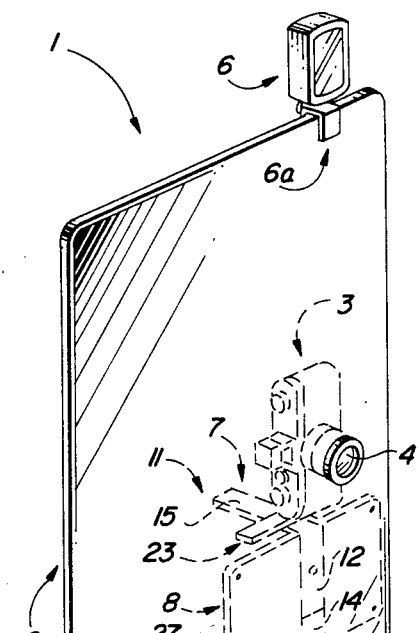
FIG. 8 is a perspective view of the camera mirror illustrated in FIG. 1, with the camera oriented in vertical configuration.
Figure 9:
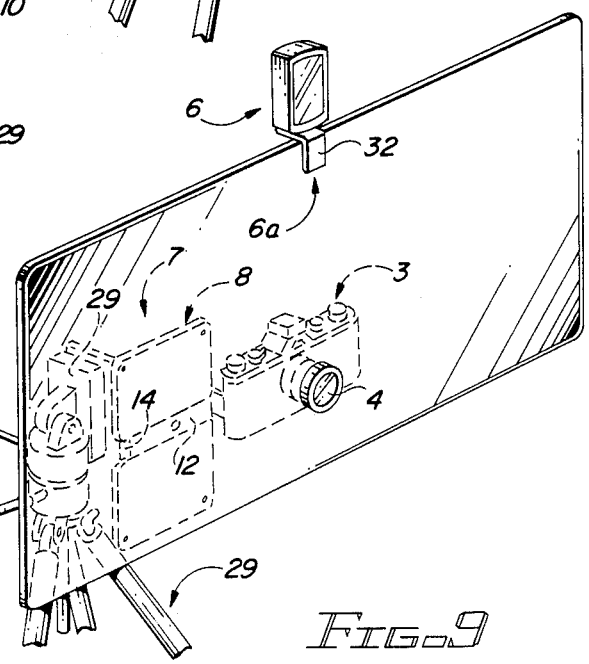
FIG. 9 is an alternative embodiment of the camera mirror illustrated in FIGS. 1 and 8, with the camera oriented in horizontal configuration.

Referring now to FIGS. 8 and 9 of the drawings, it will be appreciated that the size and orientation of the mirror 2 can be varied according to the desires of those skilled in the art. For example, in FIG. 8 the mirror is illustrated with the largest dimension oriented in the vertical configuration and the camera lens 4 extending from the mirror 2 in offset relationship with respect to the vertical center line of the mirror 2, in order to minimize distortion of the subject image. Alternatively, referring to FIG. 9, the mirror 2 illustrated in FIG. 8 is rotated 90° to provide a larger horizontal dimension, while the camera lens 4 of the camera 3 is still oriented in offset relationship with respect to the vertical center line of the mirror 2. It should be noted that in FIG. 8, the camera 3 is mounted in the vertical configuration, whereas in FIG. 9 it is mounted in a horizontal orientation, as hereinafter further described.

Referring to FIGS. 1, 2, 4A, 4B and 9, and as heretofore described, when it is desired to mount the camera 3 in the horizontal configuration on the camera mount bracket 7 with the camera lens 4 projecting through the lens opening 5, the base of the camera 3 is first seated in perpendicular relationship on the base leg 15 of the slide bracket 11, as illustrated in phantom in FIGS. 1, 2, 4A and 9. The base leg wing bolt 17 is then inserted through the base leg slot 16 of the base leg 15 to threadibly engage the internally threaded opening (not illustrated) provided in the base of the camera 3. The camera 3 is then adjusted toward the mirror 2 by loosening the base leg wing bolt 17 and height adjustment is effected by loosening the slide leg wing bolt 13 and adjusting the height of the slide bracket 11, such that the camera lens 4 projects through the lens opening 5 in the mirror 2. The slide leg wing bolt 13 and the base leg wing bolt 17 are then tightened to secure the camera 3 in this horizontal orientation and the camera mirror 1 is then ready for use.

Figure 5A:
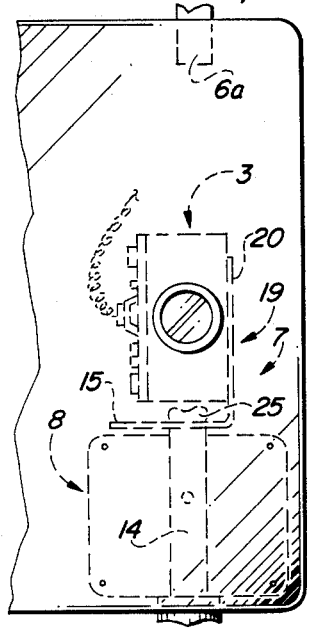
FIG. 5A is a front elevation of a portion of the camera mirror illustrated in FIG. 1, showing the camera illustrated in vertical orientation.
Figure 5B:
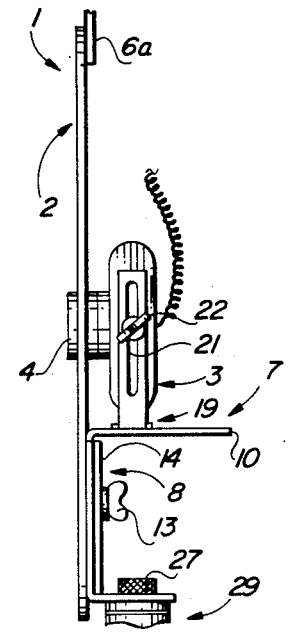
FIG. 5B is a side elevation of the camera mirror illustrated in FIG. 5A.

Referring now to FIGS. 3, 5A, 5B and 8 of the drawings, when it is desired to mount the camera 3 in the vertical orientation as illustrated in phantom in FIGS. 3, 5A and 8, the auxiliary bracket 19 is first secured to the slide bracket 11 in perpendicular orientation as illustrated in FIG. 3, by extending the bottom leg wing bolt 25 downwardly through the registering bottom leg slot 24 and base leg slot 16 and supplying a nut (not illustrated) for tightening the bottom leg wing bolt 25 against the bottom leg 23 and the base leg 15. The camera 3 is then vertically mounted to the top leg 20 of the auxiliary bracket 19, by extending the top leg wing bolt 22 through the top leg slot 21 and engaging the threaded aperture (not illustrated) provided in the bottom of the camera 3, to secure the camera 3 in vertical position. The auxiliary bracket 19 is then slidably adjusted with respect to the slide bracket 11 by loosening the bottom leg wing bolt 25 and the camera 3 is vertically adjusted by either loosening the slide leg wing bolt 13 and adjusting the height of the slide bracket 11, or loosening the top leg wing bolt 22, in order to project the camera lens 4 through the lens opening 5 in the mirror 2, as illustrated in FIGS. 3 and 8.

It will be appreciated by those skilled in the art that the primary reason for positioning the camera 3 with respect to the mirror 2 such that the camera 3 is located in offset relationship with respect to the centerline of the mirror 2, is to allow the subject to pose without distortion which results from observing the camera 3 in the reflected image. It has surprisingly been found that photographs taken with the camera 3 mounted in such an offset relationship does not affect the photograph quality and yet affords the luxury of having the subject presented in a better posed position for higher quality photography.

Referring again to FIGS. 1 and 2, in a most preferred embodiment of the invention the tripod 28 is a conventional camera tripod provided with a threaded plate aperture 30 for receiving the threaded mount plate bolt 27 and removably securing the camera mount bracket 7 and mirror 2 to the tripod 28. However, while the tripod 28 serves as a preferred support for orienting the mirror 2 in the vertical configuration for posing purposes, it will be recognized by those skilled in the art that other supporting structures can be utilized, as desired.

While the preferred embodiments of the invention have been described above, it will be recognized and understood that various modifications may be made therein and the appended claims are intended to cover all modifications which may fall within the spirit and scope of the invention.

Having described my invention with the particularity set forth above, what is claimed is:

1. A camera mirror comprising a mirror for reflecting the image of a subject to be photographed; a camera lens opening provided in said mirror, said camera lens opening located in offset relationship with respect to the center of said mirror; and a bracket mount plate adapted for mounting on said mirror and a generally L-shaped slide bracket vertically carried by said bracket mount plate in slidable relationship and adapted to removably receive and mount the camera in horizontal orientation and orient the lens of the camera in said camera lens opening for photographing the subject.

2. The camera mirror of claim 1 further comprising support means supporting said mirror.

3. The camera mirror of claim 2 wherein said support means is a tripod and further comprising a tripod plate secured to said tripod and fastening means adapted to engage said mirror and said tripod plate for securing said mirror to said tripod.

4. The camera mirror of claim 1 further comprising a generally L-shaped auxiliary bracket adapted for mounting on said slide bracket in transverse, adjustable relationship, said auxiliary bracket further adapted to removably receive and mount the camera in vertical orientation.

5. The camera mirror of claim 2 wherein said support means is a tripod and further comprising a tripod plate secured to said tripod, and bolt means carried by said bracket mount plate, said bolt means adapted to engage said tripod plate and secure said mirror to said tripod.

6. The camera mirror of claim 5 further comprising a generally L-shaped auxiliary bracket adapted for mounting on said slide bracket in transverse, adjustable relationship, said auxiliary bracket adapted to removably receive and mount the camera in vertical orientation.

7. The camera mirror of claim 6 further comprising sleeve means provided in said bracket mount plate and wherein said slide bracket is slidably and adjustably mounted in said sleeve means.

8. The camera mirror of claim 7 wherein said sleeve means is characterized by a generally rectangular-shaped channel and said channel is provided with a sleeve slot and said slide bracket is provided with a plurality of threaded apertures and further comprising a sleeve bolt projecting through said sleeve slot and threadibly engaging a selected one of said threaded apertures, for vertically adjusting said slide bracket with respect to said channel.

9. The camera mirror of claim 8 wherein said slide bracket is provided with a slide bracket slot and said auxiliary bracket is provided with an auxiliary bracket slot and further comprising an auxiliary bolt projecting through said slide bracket slot and said auxiliary bracket slot and a nut threaded on said auxiliary bolt, for horizontally adjusting said auxiliary bracket with respect to said slide bracket.

10. The camera mirror of claim 1 further comprising a flash attached to said mirror.

11. The camera mirror of claim 10 further comprising a tripod for supporting said mirror, a tripod plate secured to said tripod and a mount bolt provided in operable cooperation with said bracket mount plate, said mount bolt adapted to threadibly engage said tripod plate and secure said mirror to said tripod.

12. The camera mirror of claim 11 further comprising a generally L-shaped auxiliary bracket adapted for mounting on said slide bracket in transverse, adjustable relationship, said auxiliary bracket further adapted to removably receive and mount the camera in vertical orientation.

13. A camera mirror comprising a substantially vertically oriented mirror for reflecting the image of a subject to be photographed; a camera lens opening provided in said mirror in offset relationship with respect to the vertical centerline of said mirror; and a camera mount bracket carried by said mirror adjacent the non-reflecting surface of said mirror, said camera mount bracket characterized by a bracket mount plate fixedly mounted on said mirror and a generally L-shaped slide bracket having a first slide bracket leg vertically and slidably carried by said bracket mount plate, with the second slide bracket leg of said slide bracket adapted to removably receive and mount the camera in horizontal orientation on said mirror and project the lens of the camera through said camera lens opening for photographing the subject.

14. The camera mirror of claim 13 further comprising a generally L-shaped auxiliary bracket having a first auxiliary bracket leg adapted for mounting on said slide bracket in transverse, adjustable relationship, with the second auxiliary bracket leg of said auxiliary bracket adapted to removably receive and mount the camera in vertical orientation.

15. The camera mirror of claim 14 further comprising a tripod, a tripod plate secured to said tripod and fastening means adapted to engage said bracket mount plate and said tripod plate and secure said mirror to said tripod.

16. The camera mirror of claim 15 further comprising a sleeve channel provided in said bracket mount plate and wherein said slide bracket is slidably and adjustably mounted in said sleeve channel.

17. The camera mirror of claim 16 further comprising a flash attached to said mirror.

18. A camera mirror for posing and photographing a subject, comprising a substantially vertically oriented mirror for reflecting the image of the subject; a camera lens opening provided in said mirror in offset relationship with respect to the vertical centerline of said mirror; and a camera mount bracket carried by the non-reflecting side of said mirror, said camera mount bracket further comprising a bracket mount plate fixedly secured to said mirror and a generally L-shaped slide bracket having one leg vertically carried by said bracket mount plate in slidable relationship and the opposite leg adapted to removably receive and mount the camera in horizontal orientation.

19. The camera mirror of claim 18 further comprising a generally L-shaped auxiliary bracked adapted for mounting on said slide bracket in transverse, adjustable relationship, said auxiliary bracket further adapted to removably receive and mount the camera in vertical orientation.

20. The camera mirror of claim 19 further comprising a tripod for supporting said mirror, a tripod plate secured to said tripod and a mount bolt carried by said bracket mount plate, said mount bolt adapted to threadibly engage said tripod plate and secure said mirror to said tripod.

21. The camera mirror of claim 20 further comprising a flash attached to said mirror.

* * * * *